(12) United States Patent
Palagummi

(10) Patent No.: US 8,347,048 B2
(45) Date of Patent: Jan. 1, 2013

(54) SELF LEARNING BACKUP AND RECOVERY MANAGEMENT SYSTEM

(75) Inventor: Siva Sai Prasad Palagummi, Hyderabad (IN)

(73) Assignee: CA, Inc., Islandia, NY (US)

( * ) Notice: Subject to any disclaimer, the term of this patent is extended or adjusted under 35 U.S.C. 154(b) by 462 days.

(21) Appl. No.: 12/609,170

(22) Filed: Oct. 30, 2009

(65) Prior Publication Data

US 2011/0107043 A1 May 5, 2011

(51) Int. Cl.
*G06F 12/02* (2006.01)
(52) U.S. Cl. .................................... 711/161; 709/220
(58) Field of Classification Search .............. 711/161; 709/220
See application file for complete search history.

(56) References Cited

U.S. PATENT DOCUMENTS

| | | |
|---|---|---|
| 5,948,104 A | 9/1999 | Gluck et al. |
| 7,707,184 B1 | 4/2010 | Zhang et al. |
| 7,907,565 B2 | 3/2011 | Van de Groenendaal et al. |
| 2004/0003266 A1 | 1/2004 | Moshir et al. |
| 2004/0005873 A1 | 1/2004 | Groenendaal et al. |
| 2006/0004868 A1* | 1/2006 | Claudatos et al. ......... 707/104.1 |
| 2006/0047930 A1* | 3/2006 | Takahashi et al. ............ 711/162 |
| 2007/0283438 A1 | 12/2007 | Fries et al. |
| 2010/0132022 A1 | 5/2010 | Venkatasubramanian |
| 2011/0289057 A1 | 11/2011 | Palagummi |
| 2011/0289584 A1 | 11/2011 | Palagummi |

OTHER PUBLICATIONS

Vivek Gite, Howto: Linux Add User to Group, Mar. 14, 2006, [online] [url=http://www.cyberciti.biz/faq/howto-linux-add-user-to-group/][retreived from internet Jan. 27, 2012].*
Tanenbaum et al., Distributed Systems Principles and Paradigms, 2002, Prentice-Hall, Inc., pp. 422-425.*
"U.S. Appl. No. 12/782,263, Non Final Office Action mailed Mar. 19, 2012", 15 pgs.
"U.S. Appl. No. 12/782,318, Non Final Office Action Mailed Jan. 20, 2012", 11 pgs.
"U.S. Appl. No. 12/782,318, Response filed Apr. 16, 2012 to Non Final Office Action mailed Jan. 20, 2012", 12 pgs.

* cited by examiner

*Primary Examiner* — Jared Rutz
(74) *Attorney, Agent, or Firm* — Schwegman Lundberg & Woessner, P.A.

(57) ABSTRACT

A system and method provide for a reception of data at a computer processor. The data relates to a dataset in a computer system. The computer processor calculates a weight for the dataset as a function of the data, and the processor executes an action on the dataset as a function of the weight. In an embodiment, the action is a backup of data on the computer system, and through recalculation of the weight over a period of time, the backup schedule, backup media, and other parameters are altered based on the changing weight for a dataset.

25 Claims, 3 Drawing Sheets

SELF LEARNING BACKUP AND RECOVERY MANAGEMENT SYSTEM

FIELD OF THE INVENTION

The present disclosure relates to computer system backups and recovery, and in an embodiment, but not by way of limitation, a self learning backup and recovery system.

BACKGROUND

Virtually any non-trivial computer system includes a data backup and data recovery sub-system. These backup systems normally perform the required backups on a particular schedule and place the backup files on a particular media in a particular location, and the data is retained for a particular period of time. For example, the backup of data on a particular system may be done on a weekly basis, and the backup may be to a tape media that is then stored offsite in a secure location for a year.

The approaches described in this background section could be pursued, but are not necessarily approaches that have been previously conceived or pursued. Therefore, unless otherwise indicated herein, the approaches described in this background section are not prior art to the claims in this application and are not admitted to be prior art by inclusion in this background section.

DETAILED DESCRIPTION

Figure 1A:
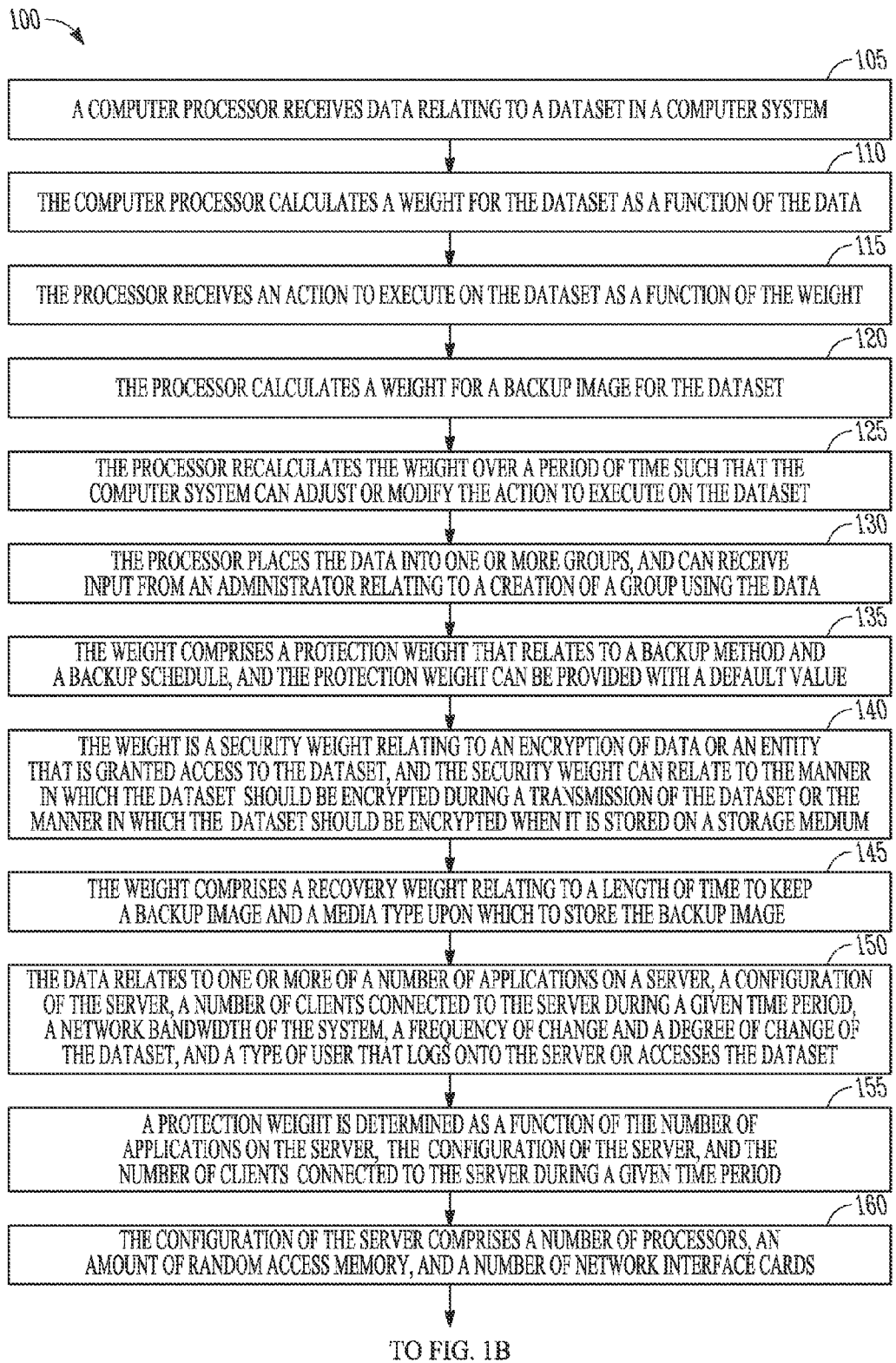
FIGS. 1A and 1B are a flowchart of an example embodiment of a self learning backup and recovery management system.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

A Self Learning Backup And Recovery Management System (SLBRMS) as disclosed herein is an expert system that can automatically decide what actions to take regarding the backup of a dataset, a retention of the backup of the dataset, and a backup schedule for the dataset. The self learning and decision making depend upon characteristics of the backup environment and operations that an administrator can perform in that environment. The SLBRMS can get to this information in multiple ways, for example, by discovering it from the existing environment, by receiving input from the administrator, and through continuous learning through monitoring of the environment.

The following is an example subset of these characteristics of a backup environment. Some or all of these characteristics could be used in a particular environment, and additional characteristics could be used in other environments. Also, the system can be expanded and generalized in such a way that user can configure custom characteristics and the action that needs be taken once a condition is met.

One characteristic that can be used in self learning of a system is the number of requests that are made to restore a dataset from a backup. For example, if a particular dataset receives many restore requests, the system can learn from this that the backups should be made to a medium and location that enables a quick restoration of the dataset, and the backup image of that dataset may have to be retained for a longer period of time than originally planned. For example, the backups should be made to a locally attached disc or accessible via a network rather than to a tape stored at an offsite location. If the backup is done to a tape, then that tape should be retained onsite for a longer period of time as compared to other tapes. The value representing this characteristic can be determined via input from an administrator or through continuous monitoring of the system. The value representing the weight associated with this characteristic can be increased or decreased based on the number of restore requests received for the dataset.

One characteristic that can be considered is the number of applications that are installed on a given server. Normally, the greater the number of applications that there are on a server, the more activity there is on a system, and the more activity on a system, the greater the amount of data that will be generated and the greater the frequency of changes to the data on that server. This characteristic can be determined through initial discovery about the system and/or continuous monitoring of the system. To determine a weight for this characteristic, an initial value can be assigned to this characteristic, and that value can then be increased for every certain number of applications that are added to the system. In this way, as more applications are added to the system, the system can learn to adjust the backups of the data in the system because of the increasing or decreasing weight of this characteristic.

Another characteristic is the system configuration, and in particular, such things as the number of processors, the amount of memory (e.g., RAM), and the number of network cards. In general, the greater the number of processors, the greater the amount of RAM, and the greater the number of network cards, the greater the importance and criticality of the system, and the more protection the system should be provided via more frequent backups. This characteristic can be determined through initial discovery or continuous monitoring. For example, if the monitoring of a system indicates that the memory, processors, or network cards are increased, the system can learn that the backups of the system should be increased. During this monitoring, the system can increase the weight of this characteristic for each processor that is added, each block of memory that is added, and each network card that is added.

Another characteristic is the number of clients connected to a server during a particular time period, or the number of users connected to a system during a particular time period. In general, the greater the number of clients or users during a particular time period, the higher the activity on the server or system, and the greater the amount of data generated on that server or system and the greater the frequency of data modification on that server or system. This characteristic can be determined through continuous monitoring or input from the administrator. The characteristic can be measured by an initial value, and then the value can be increased for every particular number of client or user connections that occurs within a certain time frame. Similarly, the value could be decreased if the number of client or user connections decreases during a certain time frame.

Another characteristic that can be considered in self learning of the system, is the network bandwidth that the system occupies over a particular period of time. In general, the greater the bandwidth in use on a system, the greater the activity there is on the system and the greater the amount of data generation and/or frequency of change of data on the system. In an embodiment, this is particularly true for bandwidth used for incoming traffic into the system. This characteristic can be determined through continuous monitoring or input from the system administrator. A value to measure this characteristic can be set to a particular value, and then increased or decreased for a certain increase or decrease in bandwidth.

Another characteristic that can be used in the self learning process is the frequency of changes made to a given dataset. As might be expected by those of skill in the art, the more frequently that data changes in a given dataset, the greater the importance that should be placed on that dataset, or notwithstanding the importance of that dataset, the more frequently the dataset should be backed up. In contrast, if there are fewer data changes between backups, then the data can be backed up less frequently, and/or the backup method can be altered from an incremental backup style to a differential backup. A differential backup involves backing up only newly added data or data that has changed since the last full backup. This characteristic can be determined through continuous monitoring of the dataset to see how often the dataset is modified, or the amount of data that is involved in regularly scheduled backups of this dataset. For example, if the size of the dataset increases substantially between backups, then the amount of new data that has been added to the dataset since the last backup has been substantial, and from this piece of information, the system can learn that backups should be increased in frequency. The value for the weight of this characteristic can be increased or decreased based on the frequency of the changes to this dataset or the amount of data involved in the regularly scheduled backup of the dataset.

Another characteristic that can be used in the self learning of a system is the type of user that accesses a particular dataset. For example, if a dataset is accessed by executives of a corporation such as a chief executive office, a chief operating officer, or a chief technology officer, that dataset is more likely than not of particular importance, and the system can learn that the backups of that dataset should be adjusted accordingly. This characteristic can be determined through input from a system administrator or from continuous monitoring. A value that represents this characteristic can be increased or decreased as a function of the frequency that a particular type of user accesses the dataset.

Another characteristic that can be used in the self learning of a system is the frequency of a particular method used in the backup of a given dataset. For example, if a system is configured to backup a particular dataset quite frequently (e.g., every hour) and in an incremental manner (e.g., particular parts of the dataset), either the user, the administrator, or both, probably place some importance on that dataset. In such a situation, the system needs to know or to learn to place as many recovery points in the dataset as necessary. This characteristic can be determined by initial discovery or through continuous monitoring. The value representing the characteristic can be increased or decreased as a function of the frequency (e.g., hourly, daily, weekly) and/or the extent of the backup (e.g., incremental, differential, or full).

Another characteristic that can be used in self learning of the system is the number of copies that an administrator makes for a particular dataset. As would be expected by one of skill in the art, if an administrator or user determines that several copies of a dataset should be made during each backup, that dataset can be determined to be relatively important. Thereafter, if a user or system administrator increases or decreases the number of backup copies for a particular dataset, the system can learn that the importance of that dataset is increasing or decreasing, and accordingly adjust such as by ensuring the success of the backup through multiple retries and raising immediate alerts in case of failure. This characteristic can be determined through initial discovery and through continuous monitoring. The value representing this characteristic can be increased or decreased as a function of an increase or decrease in the number of backup copies for a dataset.

Another characteristic that can be used in self learning of a system is the initial priorities that a system administrator has given to a dataset. For example, the administrator can characterize the data in the dataset, or to one or more datasets, and assign priorities as to the data in a dataset, or assign priorities to different datasets, to determine an order in which the data or datasets should be backed up. The value representing the weight given to this characteristic, and the alteration of that weight, can be determined via input from the administrator.

In addition to the above attributes, there could be other attributes that a user or administrator can select from the environment and the backup system, and create rules from which a weight for that attribute can be calculated. The above attributes can be grouped into different categories like Protection weight, Security weight and Recovery weight. Then, the individual attribute weights can be grouped to determine and calculate a particular Protection weight, Security weight, or Recovery weight. This grouping can be done on a system by system basis, as determined by the administrator of the system, or by a default template of the system. In this manner, such a recovery management system as disclosed herein can be spread across a number of physical hosts. In addition to above mentioned three kinds of weights, a user or system administrator can configure Custom weights and group one or more attributes under such a Custom weight. Then the user or the administrator can specify rules like what action should be taken when the total weight crosses a threshold or falls within a range. In an embodiment, there is a Policy Engine that keeps calculating these weights based on different rules, and once the weights reach certain thresholds or fall within a certain range, the system takes the configured actions for better performance. These actions can include an increase/decrease in the frequency of backup, an increase/decrease in the retention period of dataset, an increase/decrease in the security level and encryption of the dataset (on wire as well as the backup destination), an increase/decrease in the backup window, a modification of the backup method, and a modification of the destination backup media.

Figure 1B:
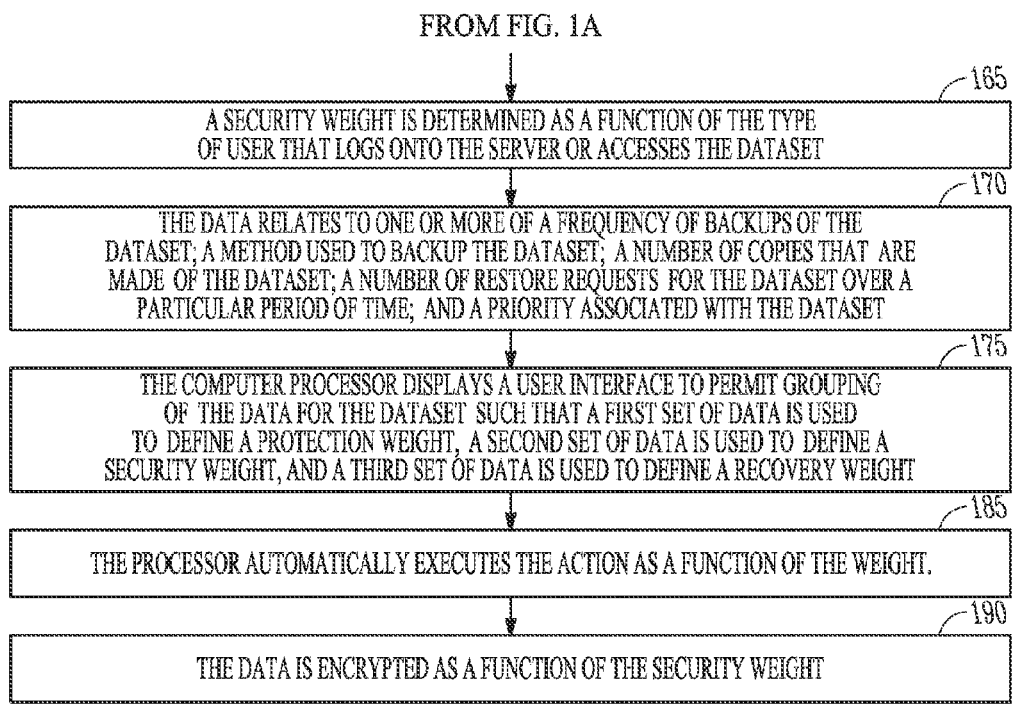

FIGS. 1A and 1B are a flowchart of an example process 100 to implement a self learning backup and recovery management system. FIGS. 1A and 1B include a number of process blocks 105-190. Though arranged serially in the example of FIGS. 1A and 1B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to process 100 in FIGS. 1A and 1B, at 105, a computer processor receives data relating to a dataset in a computer system. At 110, the computer processor calculates a weight for the dataset as a function of the data, and at 115, the processor receives an action to execute on the dataset as a function of the weight.

At 120, the processor calculates a weight for a backup image for the dataset. At 125, the processor recalculates the weight over a period of time such that the computer system can adjust or modify the action to execute on the dataset. At 130, the processor places the data into one or more groups, and can receive input from an administrator relating to a creation of a group using the data. At 135, the weight comprises a protection weight that relates to a backup method and a backup schedule, and the protection weight can be provided with a default value. At 140, the weight is a security weight relating to an encryption of data or an entity that is granted access to the dataset, and the security weight can relate to the manner in which the dataset should be encrypted during a transmission of the dataset or the manner in which the dataset should be encrypted when it is stored on a storage medium.

At 145, the weight comprises a recovery weight relating to a length of time to keep a backup image and a medium type upon which to store the backup image. At 150, the data relates to one or more of a number of applications on a server, a configuration of the server, a number of clients connected to the server during a given time period, a network bandwidth of the system, a frequency of change and a degree of change of the dataset, and a type of user that logs onto the server or accesses the dataset. At 155, a protection weight is determined as a function of the number of applications on the server, the configuration of the server, and the number of clients connected to the server during a given time period. At 160, the configuration of the server comprises a number of processors, an amount of random access memory, and a number of network interface cards. At 165, a security weight is determined as a function of the type of user that logs onto the server or accesses the dataset. At 170, the data relates to one or more of a frequency of backups of the dataset; a method used to backup the dataset; a number of copies that are made of the dataset; a number of restore requests for the dataset over a particular period of time; and a priority associated with the dataset. At 175, the computer processor displays a user interface to permit grouping of the data for the dataset such that a first set of data is used to define a protection weight, a second set of data is used to define a security weight, and a third set of data is used to define a recovery weight. At 185, the processor automatically executes the action as a function of the weight. At 190, the data is encrypted as a function of the security weight.

Figure 2:
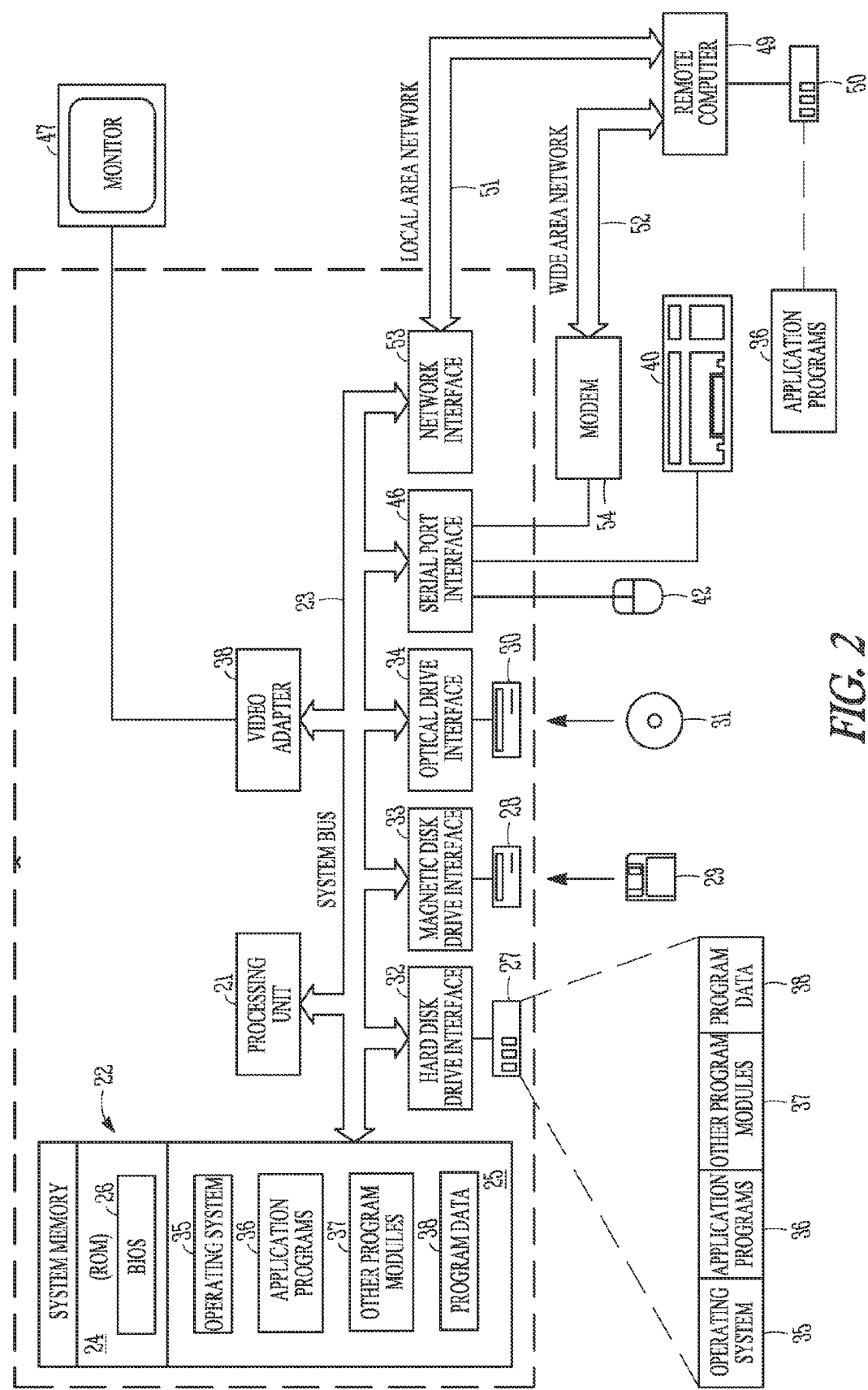
FIG. 2 is a block diagram of an example embodiment of a computer system upon which embodiments of a self learning backup and recovery management system can execute.

FIG. 2 is an overview diagram of a hardware and operating environment in conjunction with which embodiments of the invention may be practiced. The description of FIG. 2 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

As noted above, the self learning and recovery backup management system as disclosed herein can be spread across many physical hosts. Therefore, many systems and sub-systems of FIG. 2 can be involved in such a backup and recovery management system.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 2, a hardware and operating environment is provided that is applicable to any of the servers and/or remote clients shown in the other Figures.

As shown in FIG. 2, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 2 include a local area network (LAN) 51 and/or a wide area network (WAN) 52. Such networking environments are commonplace in office networks, enterprise-wide computer networks, intranets and the interne, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the interne. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for a self learning backup and recovery management system have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

What is claimed is:

1. A process comprising:
receiving at a computer processor data relating to a dataset in a computer system;
using the computer processor to calculate a weight for the dataset as a function of the data;
receiving at the processor an action to execute on the dataset as a function of the weight; and
using the computer processor to display a user interface to permit grouping of the data for the dataset such that a first set of data is used to define a protection weight, a second set of data is used to define a security weight, and a third set of data is used to define a recovery weight.

2. The process of claim 1, comprising calculating a weight for a backup image for the dataset.

3. The process of claim 1, comprising recalculating the weight over a period of time such that the computer system can adjust or modify the action to execute on the dataset.

4. The process of claim 1, comprising placing the data into one or more groups.

5. The process of claim 4, comprising receiving input from an administrator relating to a creation of a group using the data.

6. The process of claim 1, wherein the weight comprises a protection weight that relates to a backup method and a backup schedule.

7. The process of claim 6, comprising providing a default protection weight.

8. The process of claim 1, wherein the weight comprises a security weight relating to an encryption of data or an entity that is granted access to the dataset.

9. The process of claim 8, wherein the security weight relates to the manner in which the dataset should be encrypted during a transmission of the dataset or the manner in which the dataset should be encrypted when it is stored on a storage medium.

10. The process of claim 8, comprising encrypting the data as a function of the security weight.

11. The process of claim 1, wherein the weight comprises a recovery weight relating to a length of time to keep a backup image and a media type upon which to store the backup image.

12. The process of claim 1, wherein the data relates to one or more of a number of applications on a server, a configuration of the server, a number of clients connected to the server during a given time period, a network bandwidth of the system, a frequency of change and a degree of change of the dataset, and a type of user that logs onto the server or accesses the dataset.

13. The process of claim 12, wherein a protection weight is determined as a function of the number of applications on the server, the configuration of the server, and the number of clients connected to the server during a given time period.

14. The process of claim 12, wherein the configuration of the server comprises a number of processors, an amount of random access memory, and a number of network interface cards.

15. The process of claim 12, wherein a security weight is determined as a function of the type of user that logs onto the server or accesses the dataset.

16. The process of claim 1, wherein the data relates to one or more of a frequency of backups of the dataset; a method used to backup the dataset; a number of copies that are made of the dataset; a number of restore requests for the dataset over a particular period of time; and a priority associated with the dataset.

17. The process of claim 1, comprising using the processor to automatically execute the action as a function of the weight.

18. A non-transitory computer readable medium comprising instructions that when executed by a computer processor execute a process comprising:
receiving at a computer processor data relating to a dataset in a computer system;
using the computer processor to calculate a weight for the dataset as a function of the data;
receiving at the processor an action to execute on the dataset as a function of the weight; and
using the computer processor to display a user interface to permit grouping of the data for the dataset such that a first set of data is used to define a protection weight, a second set of data is used to define a security weight, and a third set of data is used to define a recovery weight.

19. The non-transitory computer readable medium of claim 18, comprising instructions for recalculating the weight over a period of time such that the computer system can adjust or modify the action to execute on the dataset.

20. The non-transitory computer readable medium of claim 18, comprising instructions for placing the data into one or more groups.

21. The non-transitory computer readable medium of claim 19, wherein the weight comprises one or more of a protection weight that relates to a backup method and a backup schedule, a security weight relating to an encryption of data or an entity that is granted access to the dataset, and a recovery weight relating to a length of time to keep a backup image and a medium type upon which to store the backup image.

22. A computer system comprising:
a computer processor configured for receiving data relating to a dataset in a computer system;
a computer processor configured for calculating a weight for the dataset as a function of the data; and
a computer processor configured for receiving an action to execute on the dataset as a function of the weight
wherein the data relates to one or more of a number of applications on a server, a configuration of the server, a number of clients connected to the server during a given time period, a network bandwidth of the system, a frequency of change and a degree of change of the dataset, and a type of user that logs onto the server or accesses the dataset; and
wherein a protection weight is determined as a function of the number of applications on the server, the configuration of the server, and the number of clients connected to the server during a given time period.

23. The computer system of claim 22, comprising a processor configured for recalculating the weight over a period of time such that the computer system can adjust or modify the action to execute on the dataset.

24. The computer system of claim 22, comprising a processor configured for placing the data into one or more groups.

25. The computer system of claim 22, wherein the weight comprises one or more of a protection weight that relates to a backup method and a backup schedule, a security weight relating to an encryption of data or an entity that is granted access to the dataset, and a recovery weight relating to a length of time to keep a backup image and a media type upon which to store the backup image.

* * * * *